Patented Oct. 14, 1941

2,259,178

UNITED STATES PATENT OFFICE 2,259,178

METHOD OF MAKING COMPOSITE TITANIUM PIGMENTS

Lonnie W. Ryan, Westfield, N. J., and Winfred Joseph Cauwenberg, Piney River, Va., assignors to Interchemical Corporation, New York, N. Y., a corporation of Ohio No Drawing. Application June 7, 1939, Serial No. 277,810

7 Claims. (Cl. 106—300)

This invention relates to the manufacture of composite pigments containing titanium dioxide and inert extenders such as calcium sulfate, and has particular reference to a new and novel method of precipitating such pigments, characterized by very rapid admixture of a titanium sulfate solution with a slurry of the extender, whereby pigment of improved properties is obtained.

In the manufacture of composite pigments containing titanium dioxide and extenders such as calcium sulfate, a great many methods have been adopted. In the early stages of the development of these pigments, they were prepared by admixing soluble calcium salt solutions with titanium sulfate solutions and boiling the mixtures to precipitate hydrolyzed basic titanium compounds on the freshly precipitated calcium sulfate, followed by filtration, washing and calcination. Because of the difficulty of controlling the calcium sulfate crystal formation by this method, attempts were made to admix separately prepared slurries of calcium sulfate with precipitated titanium dioxide slurries, filtering, washing and calcining the mixture. This gave relatively poor admixture of the constituents. The industry has generally adopted still another method which gives perfect admixture, improved pigment properties and low operating costs. This method involves preparing a calcium sulfate slurry of predetermined crystalline characteristics, admixing it with a titanium sulfate solution, and heating the mixture to cause hydrolytic precipitation of the titanium in the presence of the calcium sulfate.

We have discovered that greatly improved pigment properties can be obtained in the practice of this method, together with economies in operation due to greater ease of handling and filtration, by controlling the rate of admixture of the titanium sulfate solution and the calcium sulfate slurry so that the entire admixture is complete in not over three minutes, and preferably within one minute, thereafter boiling the mixed solution to precipitate the titanium content of the solution, and calcining the precipitate.

We believe that the improved results obtained are due to the fact that the rapid admixture prevents the formation of such substantial quantities of colloidal hydrated titanium dioxide in the mixture, as are probably obtained when the titanium solution and the calcium sulfate solution are admixed in conventional manner. Since the calcium sulfate particles seem to act as nuclei for the hydrolytic precipitation of the hydrated TiO₂, the presence of substantial quantities of colloidal hydrated $TiO_2$ is unnecessary and undesirable because of the harmful effect on the final pigment properties and on the handling properties of the precipitate.

Example 1

As a typical example of our invention, we prepare 700 pounds of anhedral gypsum crystals, preferably by rehydrating partially dehydrated gypsum, according to the method described in our copending application, Serial Number 138,104, filed April 21, 1937, now Patent No. 2,207,416, patented July 9, 1940.

The 700 pounds of rehydrated gypsum are then charged into a pebble mill together with 168 gallons of water containing 2.45 pounds of hydrated lime—Ca(OH)₂—and 1.4 pounds of sodium sulfite and milled for about two hours whereby the agglomerated gypsum particles are dispersed. This milling breaks down the agglomerate structure.

The milled gypsum-water slurry is transferred to a tank and 117 gallons of water at 100° C. and containing about one pound of 93% sulfuric acid is added. The temperature is brought to about 70° C. and 1930 pounds of an ilmenite ore solution, at a temperature of 65° C., and from which a part of the iron has been removed by crystallization as ferrous sulfate, and containing about 5 grams per liter of titanous sulfate calculated as TiO₂, and analyzing as follows, are added during about ½ minute:

| | Per cent |
|---|---|
| TiO₂ | 11.6 |
| Sulfuric acid, free and combined with TiO₂ | 31.2 |

22.6 pounds of 93% sulfuric acid are then added and the mixture is rapidly heated to the boiling temperature and boiled until about 95% of the titanium is precipitated. The composite precipitate is filtered or separated from the mother liquor by other means, washed and calcined at a temperature of about 900° C.

Example 2

Seventy-five (75) pounds of commercial lime (CaO) are slaked in 500 pounds of water and the slurry of hydrated lime diluted to 10% concentration. One hundred thirty-five (135) pounds of 66° Bé. sulfuric acid diluted with 500 pounds of water are slowly added to the lime slurry during a period of one hour with continuous agitation, the temperature meanwhile rising to 46° C. The charge is agitated for one hour after mixing to ensure complete reaction and then filtered to obtain a more concentrated calcium sulfate pulp, which is then adjusted to a weight of 700 pounds.

To this slurry containing acicular gypsum crystals is added 560 pounds of the titanium solution of Example 1 during a period of 45 seconds. 53 pounds of 90% sulfuric acid is added and the mixture is rapidly heated to the boiling point and boiled for about 5 hours, until 95% of its titanium content is hydrolytically precipitated. The precipitate is filtered, washed and calcined.

While the examples show the precipitation of composite pigments of titanium dioxide and calcium sulfate, in which our new process is most advantageously used, it may also be used to advantage in making other extended titanium pigments in which the extenders act as nuclei for the precipitation of the hydrated titanium dioxide. By preference, we add the titanium solution to the calcium sulfate slurry, since we have found that best results are obtained by following this procedure.

This application is a continuation in part of our copending application Serial Number 138,104, filed April 21, 1937.

We claim:

1. The steps in the method of preparing composite pigments containing titanium dioxide which comprises mixing a titanium sulfate solution and an aqueous suspension of an extender which acts as a nucleus for the hydrolytic precipitation of hydrated titanium dioxide, under such conditions that the admixture is complete in not over three minutes and immediately thereafter rapidly heating the mixture to a temperature where the titanium content of the solution is hydrolytically precipitated.

2. The steps in the method of preparing composite pigments containing titanium dioxide which comprises mixing a titanium sulfate solution and an aqueous suspension of an extender which acts as a nucleus for the hydrolytic precipitation of hydrated titanium dioxide, under such conditions that the admixture is complete in not over one minute and immediately thereafter rapidly heating the mixture to a temperature where the titanium content of the solution is hydrolytically precipitated.

3. The steps in the method of preparing composite pigments containing titanium dioxide which comprises mixing a titanium sulfate solution and an aqueous suspension of calcium sulfate, under such conditions that the admixture is complete in not over three minutes and immediately thereafter rapidly heating the mixture to a temperature where the titanium content of the solution is hydrolytically precipitated.

4. The steps in the method of preparing composite pigments containing titanium dioxide which comprises mixing a titanium sulfate solution and an aqueous suspension of calcium sulfate, under such conditions that the admixture is complete in not over one minute and immediately thereafter rapidly heating the mixture to a temperature where the titanium content of the solution is hydrolytically precipitated.

5. The steps in the method of preparing composite pigments containing titanium dioxide which comprises adding a titanium sulfate solution to an aqueous suspension of an extender which acts as a nucleus for the hydrolytic precipitation of hydrated titanium oxide, during not more than three minutes and immediately thereafter rapidly heating the mixture to a temperature where the titanium content of the solution is hydrolytically precipitated.

6. The steps in the method of preparing composite pigments containing titanium dioxide which comprises adding a titanium sulfate solution to an aqueous suspension of calcium sulfate, under such conditions that the admixture is complete in not over one minute and immediately thereafter rapidly heating the mixture to a temperature where the titanium content of the solution is hydrolytically precipitated.

7. The method of preparing composite pigments containing titanium dioxide which comprises mixing a titanium sulfate solution and an aqueous suspension of calcium sulfate, completing the admixture in not over one minute, immediately thereafter rapidly heating the solution to complete the hydrolytic precipitation of the titanium compounds, separating the pigment from the liquid, and calcining the pigment.

LONNIE W. RYAN.
WINFRED JOSEPH CAUWENBERG.